US009632638B2

(12) United States Patent
Worfolk (10) Patent No.: US 9,632,638 B2
(45) Date of Patent: Apr. 25, 2017

(54) DEVICE AND METHOD FOR FORCE AND PROXIMITY SENSING EMPLOYING AN INTERMEDIATE SHIELD ELECTRODE LAYER

(71) Applicant: SYNAPTICS INCORPORATED, San Jose, CA (US)

(72) Inventor: Patrick Worfolk, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 176 days.

(21) Appl. No.: 14/482,121

(22) Filed: Sep. 10, 2014

(65) Prior Publication Data

US 2016/0070398 A1 Mar. 10, 2016

(51) Int. Cl.
G06F 3/041 (2006.01)
G06F 3/044 (2006.01)
G06F 3/047 (2006.01)

(52) U.S. Cl.
CPC .... *G06F 3/044* (2013.01); *G06F 2203/04105* (2013.01)

(58) Field of Classification Search
USPC .......................................................... 345/174
See application file for complete search history.

(56) References Cited

U.S. PATENT DOCUMENTS

| 5,510,813 A | 4/1996 | Makinwa et al. |
| 5,942,733 A * | 8/1999 | Allen et al. ............. G06F 3/044 178/18.01 |
| 5,943,044 A | 8/1999 | Martinelli et al. |
| 6,002,389 A | 12/1999 | Kasser |
| 7,154,481 B2 | 12/2006 | Cross et al. |
| 7,395,717 B2 | 7/2008 | DeAngelis et al. |
| 7,538,760 B2 | 5/2009 | Hotelling et al. |
| 7,825,911 B2 | 11/2010 | Sano et al. |
| 8,063,886 B2 | 11/2011 | Serban et al. |

(Continued)

FOREIGN PATENT DOCUMENTS

JP WO 2014129083 A1 * 8/2014 ........... G06F 3/0414
KR 20130081556 A 7/2013

(Continued)

OTHER PUBLICATIONS

Korean Intellectual Property Office International Searching Authority, International Search Report and Written Opinion for International Application No. PCT/US2014/023037, mailed Jul. 9, 2014.

(Continued)

*Primary Examiner* — Jennifer Mehmood
*Assistant Examiner* — Deeprose Subedi
(74) *Attorney, Agent, or Firm* — Osha Liang LLP (57) ABSTRACT

Methods, systems and devices are described for use with an electronic system. The device includes a pliable component having an input surface and a first plurality of sensor electrodes; a support substrate spaced apart from the pliable component; a second plurality of sensor electrodes disposed on a second substrate; a spacing layer disposed between the pliable component and the support substrate, the spacing layer configured to locally deform in response to a force applied to the input surface; and a shield electrode layer disposed between the first plurality and the second plurality of sensor electrodes.

18 Claims, 6 Drawing Sheets

(56) References Cited

U.S. PATENT DOCUMENTS

| | | |
|---|---|---|
| 8,607,651 B2 | 12/2013 | Eventoff |
| 8,627,716 B2 | 1/2014 | Son |
| 8,653,834 B2 | 2/2014 | Reynolds |
| 2001/0013855 A1 | 8/2001 | Fricker et al. |
| 2004/0090429 A1 | 5/2004 | Geaghan et al. |
| 2006/0260417 A1 | 11/2006 | Son et al. |
| 2007/0229464 A1 | 10/2007 | Hotelling et al. |
| 2007/0236466 A1 | 10/2007 | Hotelling |
| 2008/0158173 A1 | 7/2008 | Hamblin et al. |
| 2008/0174321 A1 | 7/2008 | Kang et al. |
| 2008/0316182 A1 | 12/2008 | Antila et al. |
| 2009/0091551 A1 | 4/2009 | Hotelling et al. |
| 2009/0267916 A1* | 10/2009 | Hotelling ................ G06F 3/044 345/174 |
| 2009/0314621 A1 | 12/2009 | Hotelling |
| 2010/0242629 A1 | 9/2010 | Leuenberger et al. |
| 2010/0253651 A1 | 10/2010 | Day |
| 2010/0282000 A1 | 11/2010 | Gorjanc et al. |
| 2011/0227872 A1 | 9/2011 | Huska et al. |
| 2012/0013573 A1 | 1/2012 | Liu et al. |
| 2012/0026124 A1 | 2/2012 | Li et al. |
| 2012/0038583 A1 | 2/2012 | Westhues et al. |
| 2012/0062245 A1 | 3/2012 | Bao et al. |
| 2012/0105367 A1 | 5/2012 | Son et al. |
| 2012/0206401 A1 | 8/2012 | Lin et al. |
| 2012/0256876 A1 | 10/2012 | Yeh et al. |
| 2012/0299866 A1 | 11/2012 | Pao et al. |
| 2012/0313873 A1 | 12/2012 | Bright et al. |
| 2013/0021089 A1 | 1/2013 | Sakurai et al. |
| 2013/0030740 A1 | 1/2013 | Bulea |
| 2013/0047747 A1 | 2/2013 | Joung |
| 2013/0050139 A1 | 2/2013 | G te |
| 2013/0271160 A1 | 10/2013 | Solven et al. |
| 2013/0278542 A1 | 10/2013 | Stephanou et al. |
| 2014/0022201 A1 | 1/2014 | Boychuk et al. |
| 2014/0062934 A1* | 3/2014 | Coulson et al. ........ G06F 3/044 345/174 |
| 2015/0130742 A1 | 5/2015 | Chen et al. |
| 2015/0355771 A1* | 12/2015 | Watazu et al. ........ G06F 3/0414 345/174 |

FOREIGN PATENT DOCUMENTS

| | | |
|---|---|---|
| WO | 2013009778 A1 | 1/2013 |
| WO | 2014037016 A1 | 3/2014 |

OTHER PUBLICATIONS

Korean Intellectual Property Office International Searching Authority, International Search Report and Written Opinion for International Application No. PCT/US2014/038775, mailed Oct. 28, 2014.
USPTO, Non-Final Office Action Response in U.S. Appl. No. 13/838,003, filed Jun. 30, 2014.
USPTO, Notice of Allowance and Fee(s) Due in U.S. Appl. No. 13/838,003, mailed Aug. 18, 2014.
Korean Intellectual Property Office International Searching Authority, International Search Report and Written Opinion for International Application No. PCT/US2014/017900, mailed Jun. 8, 2014.
International Search Report and Written Opinion issued in PCT/US2015/049165 mailed Feb. 19, 2016 (14 pages).

* cited by examiner

DEVICE AND METHOD FOR FORCE AND PROXIMITY SENSING EMPLOYING AN INTERMEDIATE SHIELD ELECTRODE LAYER

FIELD OF THE INVENTION

This invention generally relates to electronic devices, and more specifically relates to force enabled sensor devices and using sensor devices for producing user interface inputs.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

The proximity sensor device can be used to enable control of an associated electronic system. For example, proximity sensor devices are often used as input devices for larger computing systems, including: notebook computers and desktop computers. Proximity sensor devices are also often used in smaller systems, including: handheld systems such as personal digital assistants (PDAs), remote controls, and communication systems such as wireless telephones and text messaging systems. Increasingly, proximity sensor devices are used in media systems, such as CD, DVD, MP3, video or other media recorders or players. The proximity sensor device can be integral or peripheral to the computing system with which it interacts.

Presently known input devices also have the ability to detect applied force in addition to determining positional information for input objects interacting with a sensing region of the input device. However, in some force/touch input devices, the force sensing and touch sensing electrodes may interact during applied force. This cross coupling of the force receivers and touch receivers makes it difficult to accurately locate an input object (e.g., finger) where an input surface experiences deflection due to an applied input object. These factors limit the flexibility and usability of presently known force enabled input devices. A full transcapacitive image sensor is thus needed in which the touch image remains independent of the force image during deflection of the input surface.

BRIEF SUMMARY OF THE INVENTION

Embodiments of the present invention provide a device and method that facilitates improved device usability. The device and method provide improved user interface functionality by disposing a shielding electrode layer between the transmitter and receiver electrode layers. In this way, the effects of input surface deflection may be effectively removed from the touch signal.

More particularly, in an embodiment the sensor stack up includes a first layer having transmit electrodes and touch receiver electrodes, a second layer having shield electrodes configured to render the touch image independent of applied pressure, and a third layer having force receiver electrodes, with a compressible dielectric layer interposed between the second and third layers. By matching the geometry of the shield electrodes to the geometry of the touch receivers, the shield electrode layer: i) blocks the touch receivers from interacting with the force receivers during deflection; and ii) allows the common transmitter electrodes to interact with the force receivers during deflection Moreover, the shielding electrode layer may be maintained at a constant voltage potential, for example, at a reference or system ground, using only a single wire.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved usability. User interface functionality may be enhanced by arranging touch receiver electrodes and transmitter electrodes in a top layer, force receiver electrodes in a bottom layer, and interposing a compressible layer and a shield electrode layer between the top and bottom layers to thereby make the touch image produced by the top layer substantially or wholly independent of bending or translation of the input surface due to applied force.

Figure 1:
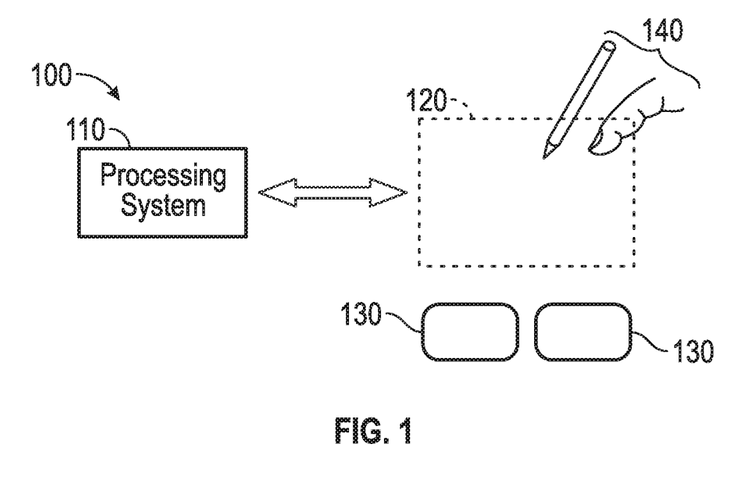
FIG. 1 is a block diagram of an exemplary electronic system that includes an input device and a processing system in accordance with an embodiment of the invention.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In a preferred embodiment, the input device 100 is implemented as a force enabled touchpad system including a processing system 110 and a sensing region 120. Sensing region 120 (also often referred to as "touchpad") is configured to sense input provided by one or more input objects 140 in the sensing region 120. Example input objects include fingers, thumb, palm, and styli. The sensing region 120 is illustrated schematically as a rectangle; however, it should be understood that the sensing region may be of any convenient form and in any desired arrangement on the surface of and/or otherwise integrated with the touchpad.

Sensing region 120 includes sensors for detecting force and proximity, as described in greater detail below in conjunction with FIG. 2. Sensing region 120 may encompass any space above (e.g., hovering), around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device is adapted to provide user interface functionality by facilitating data entry responsive to the position of sensed objects and the force applied by such objects. Specifically, the processing system is configured to determine positional information for objects sensed by a sensor in the sensing region. This positional information can then be used by the system to provide a wide range of user interface functionality. Furthermore, the processing system is configured to determine force information for objects from measures of force determined by the sensor in the sensing region. This force information can then also be used by the system to provide a wide range of user interface functionality, for example, by providing different user interface functions in response to different levels of applied force by objects in the sensing region. Furthermore, the processing system may be configured to determine input information for more than one object sensed in the sensing region. Input information can be based upon a combination the force information, the positional information, the number of input objects in the sensing region and/or in contact with the input surface, and a duration the one or more input objects is touching or in proximity to the input surface. Input information can then be used by the system to provide a wide range of user interface functionality.

The input device is sensitive to input by one or more input objects (e.g. fingers, styli, etc.), such as the position of an input object within the sensing region. The sensing region encompasses any space above, around, in and/or near the input device in which the input device is able to detect user input (e.g., user input provided by one or more input objects). The sizes, shapes, and locations of particular sensing regions may vary widely from embodiment to embodiment. In some embodiments, the sensing region extends from a surface of the input device in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device, contact with an input surface (e.g. a touch surface) of the input device, contact with an input surface of the input device coupled with some amount of applied force, and/or a combination thereof. In various embodiments, input surfaces may be provided by surfaces of casings within which the sensor electrodes reside, by face sheets applied over the sensor electrodes or any casings.

The electronic system 100 may utilize any combination of sensor components and sensing technologies to detect user input (e.g., force, proximity) in the sensing region 120 or otherwise associated with the touchpad. The input device 102 comprises one or more sensing elements for detecting user input. As several non-limiting examples, the input device 100 may use capacitive, elastive, resistive, inductive, magnetic, acoustic, ultrasonic, and/or optical techniques.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It should also be understood that the input device may be implemented with a variety of different methods to determine force imparted onto the input surface of the input device. For example, the input device may include mechanisms disposed proximate the input surface and configured to provide an electrical signal representative of an absolute or a change in force applied onto the input surface. In some embodiments, the input device may be configured to determine force information based on a defection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

In FIG. 1, a processing system 110 is shown as part of the input device 100. However, in other embodiments the processing system may be located in the host electronic device with which the touchpad operates. The processing system 110 is configured to operate the hardware of the input device 100 to detect various inputs from the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. The types of actions may include, but are not limited to, pointing, tapping, selecting, clicking, double clicking, panning, zooming, and scrolling. Other examples of possible actions include an initiation and/or rate or speed of an action, such as a click, scroll, zoom, or pan.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information, particularly regarding the presence of an input object in the sensing region. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Likewise, the term "force information" as used herein is intended to broadly encompass force information regardless of format. For example, the force information can be provided for each input object as a vector or scalar quantity. As another example, the force information can be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

Likewise, the term "input information" as used herein is intended to broadly encompass temporal, positional and force information regardless of format, for any number of input objects. In some embodiments, input information may be determined for individual input objects. In other embodiments, input information comprises the number of input objects interacting with the input device.

In some embodiments, the input device 100 is implemented with additional input components that are operated by the processing system 110 or by some other processing system. These additional input components may provide redundant functionality for input in the sensing region 120, or some other functionality. For example, buttons (not shown) may be placed near the sensing region 120 and used to facilitate selection of items using the input device 102. Other types of additional input components include sliders, balls, wheels, switches, and the like. Conversely, in some embodiments, the input device 100 may be implemented with no other input components.

In some embodiments, the electronic system 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

It should also be understood that the input device may be implemented with a variety of different methods to determine force imparted onto the input surface of the input device. For example, the input device may include mechanisms disposed proximate to the input surface and configured to provide an electrical signal representative of an absolute or a change in force applied onto the input surface. In some embodiments, the input device may be configured to determine force information based on a deflection of the input surface relative to a conductor (e.g. a display screen underlying the input surface). In some embodiments, the input surface may be configured to deflect about one or multiple axis. In some embodiments, the input surface may be configured to deflect in a substantially uniform or non-uniform manner.

As described above, in some embodiments some part of the electronic system processes information received from the processing system to determine input information and to act on user input, such as to facilitate a full range of actions. It should be appreciated that some uniquely input information may result in the same or different action. For example, in some embodiments, input information for an input object comprising, a force value F, a location X,Y and a time of contact T may result in a first action. While input information for an input object comprising a force value F', a location X',Y' and a time of contact T' (where the prime values are uniquely different from the non-prime values) may also result in the first action. Furthermore, input information for an input object comprising a force value F, a location X',Y and a time of contact T' may result in a first action. While the examples below describe actions which may be performed based on input information comprising a specific range of values for force, position and the like, it should be appreciated that that different input information (as described above) may result in the same action. Furthermore, the same type of user input may provide different functionality based on a component of the input information. For example, different values of F, X/Y and T may result in the same type of action (e.g. panning, zooming, etc.), that type of action may behave differently based upon said values or other values (e.g. zooming faster, panning slower, and the like).

As noted above, the embodiments of the invention can be implemented with a variety of different types and arrangements of capacitive sensor electrodes for detecting force and/or positional information. To name several examples, the input device can be implemented with electrode arrays that are formed on multiple substrate layers, typically with the electrodes for sensing in one direction (e.g., the "X" direction) formed on a first layer, while the electrodes for sensing in a second direction (e.g., the "Y" direction are formed on a second layer. In other embodiments, the sensor electrodes for both the X and Y sensing can be formed on the same layer. In yet other embodiments, the sensor electrodes can be arranged for sensing in only one direction, e.g., in either the X or the Y direction. In still another embodiment, the sensor electrodes can be arranged to provide positional information in polar coordinates, such as "r" and "θ" as one example. In these embodiments the sensor electrodes themselves are commonly arranged in a circle or other looped shape to provide "θ", with the shapes of individual sensor electrodes used to provide "r".

Also, a variety of different sensor electrode shapes can be used, including electrodes shaped as thin lines, rectangles, diamonds, wedge, etc. Finally, a variety of conductive materials and fabrication techniques can be used to form the sensor electrodes. As one example, the sensor electrodes are formed by the deposition and etching of conductive ink on a substrate.

In some embodiments, the input device is comprises a sensor device configured to detect contact area and location of a user interacting with the device. The input sensor device may be further configured to detect positional information about the user, such as the position and movement of the hand and any fingers relative to an input surface (or sensing region) of the sensor device.

In some embodiments, the input device is used as an indirect interaction device. An indirect interaction device may control GUI actions on a display which is separate from the input device, for example a touchpad of a laptop computer. In one embodiment, the input device may operate as a direct interaction device. A direct interaction device controls GUI actions on a display which underlies a proximity sensor, for example a touch screen. There are various usability differences between indirect and direct more which may confuse or prevent full operation of the input device. For example, an indirect input device may be used to position a cursor over a button by moving an input object over a proximity sensor. This is done indirectly, as the motion of the input does not overlap the response on the display. In a similar case, a direct interaction device may be used to position a cursor over a button by placing an input object directly over or onto the desired button on a touch screen.

Figure 2:
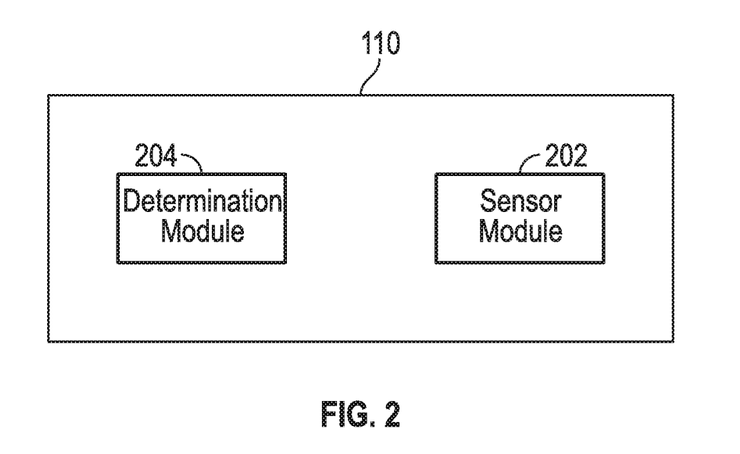
FIG. 2 is a schematic view of an exemplary processing system in accordance with an embodiment of the invention.

Referring now to FIGS. 1 and 2, the processing system 110 includes a sensor module 202 and a determination module 204. Sensor module 202 is configured to receive resulting signals from the sensors associated with sensing region 120. Determination module 204 is configured to process the data, and to determine positional information and force information. The embodiments of the invention can be used to enable a variety of different capabilities on the host device. Specifically, it can be used to enable cursor positioning, scrolling, dragging, icon selection, closing windows on a desktop, putting a computer into sleep mode, or perform any other type of mode switch or interface action.

Figure 3:
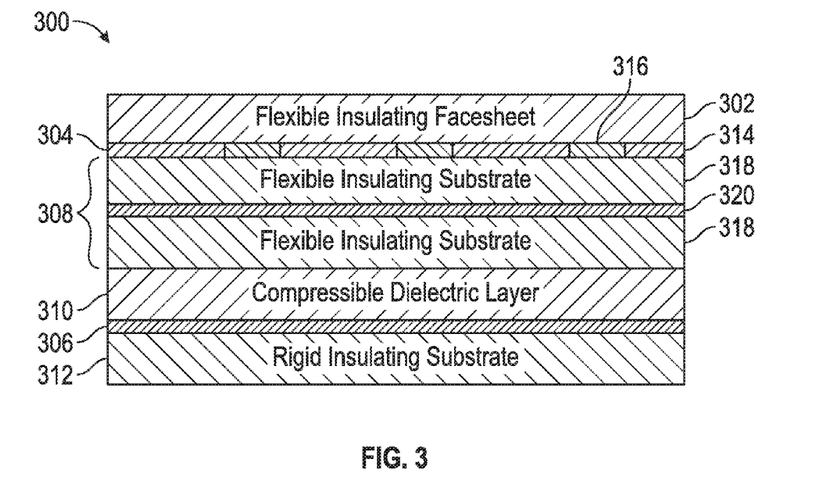
FIG. 3 is a cross section view of a force enabled touch sensor having a top electrode layer, a bottom electrode layer, and a shield electrode layer therebetween in accordance with an embodiment of the invention.

FIG. 3 is a cross section view of a force enabled touch sensor stackup 300 including a flexible insulating facesheet 302, a top electrode layer 304, and a bottom electrode layer 306 comprising force receiver electrodes. The top electrode layer 304 comprises a first subset 314 of touch receiver electrodes and a second subset 316 of transmitter electrodes. A flexible insulating substrate layer 308 and a compressible dielectric layer 310 are disposed between the top electrode layer 304 and the bottom electrode layer 306. A rigid insulating substrate 312 underlies and supports the stackup 300. In the illustrated embodiment, the substrate layer 308 comprises a shield electrode layer 320 sandwiched between respective insulating layers 318.

In various embodiments, the compressible dielectric layer 310 may comprise a silicon sheet, a foam, or a rubber material which may be uniform, molded and/or contain apertures. Alternatively, the compressible dielectric layer 310 may comprise air, optical clear adhesive (OCA), or any other compressible medium which may be characterized by a bending or compressible stiffness. In addition, the compressible layer may form an array of individual compressible structures; in other embodiments, the compressible structures may be disposed on a separate substrate which is then coupled to either the flexible insulating substrate 308 or the bottom electrode layer 306. Also, in various embodiments, the compressible layer may comprise a grid of compressible structures, or other suitable shapes. In any event, the compressible layer is configured to facilitate the local deflection of the top electrode layer 304 toward the bottom electrode layer 306 in response to force applied to the input surface.

Figure 4A:
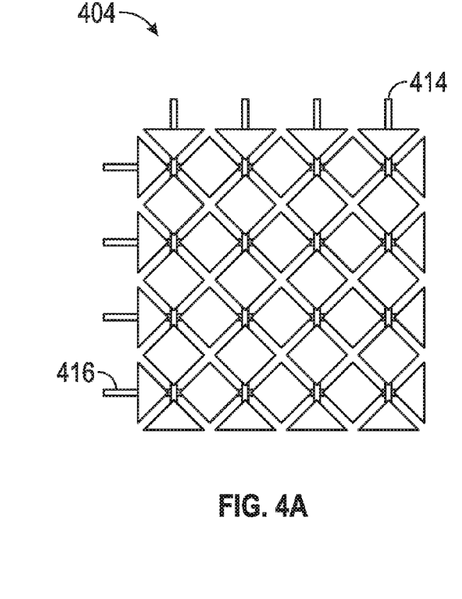
FIG. 4A is a top plan view of the top electrode layer of FIG. 3, showing first subset of touch receiver electrodes and a second subset of transmitter electrodes in accordance with an embodiment of the invention.

FIG. 4A is a top plan view of a top electrode layer 404 (generally analogous to the top electrode layer 304 of FIG. 3), showing first subset 414 of touch receiver electrodes and a second subset 416 of transmitter electrodes in accordance with an embodiment.

Figure 4B:
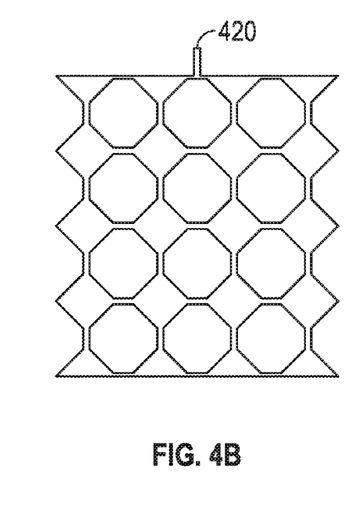
FIG. 4B is a top plan view of the shield electrode layer of FIG. 3, exhibiting a geometry which generally resembles the touch receiver electrodes of FIG. 4A in accordance with an embodiment of the invention.

FIG. 4B is a top plan view of a shield electrode layer 420 (generally analogous to the shield electrode layer 320 of FIG. 3). Note that the geometry and layout of the shield electrode layer 420 generally corresponds to and is substantially aligned with the touch receiver electrode layer 414, except that, in an embodiment, the shield electrodes are slightly larger than the corresponding touch receiver electrodes, as described in greater detail below in conjunction with FIG. 5.

Figure 4C:
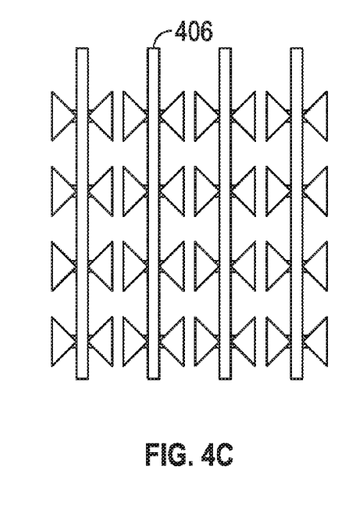
FIG. 4C is a top plan view of the bottom electrode layer of FIG. 3, showing force receiver electrodes exhibiting a geometry which generally resembles the transmitter electrodes of FIG. 4A in accordance with an embodiment of the invention.
Figure 6A:
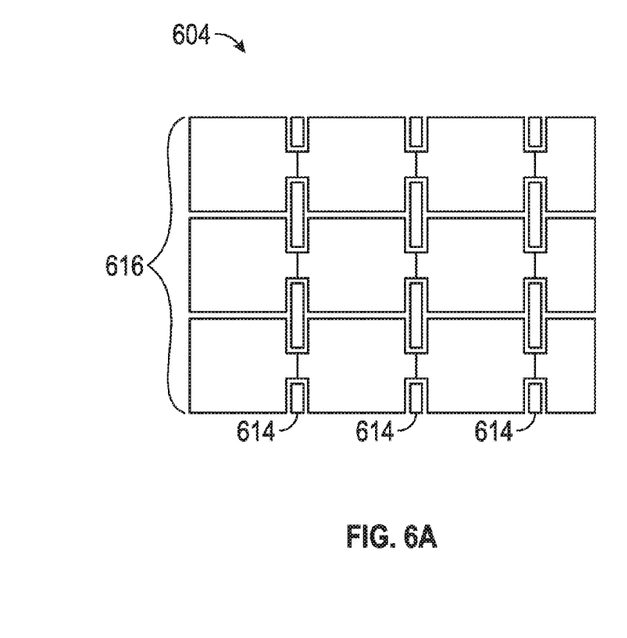
FIGS. 6A-6C illustrate another embodiment of the various electrode layers shown in FIGS. 3 and 4.
Figure 6B:
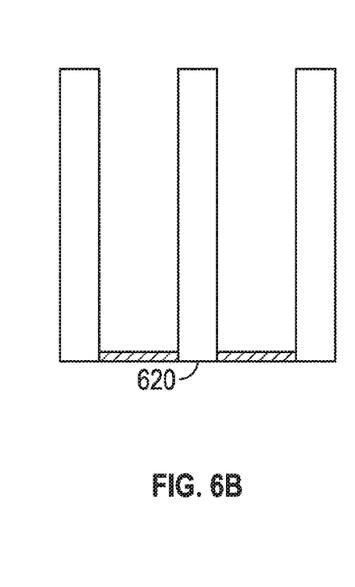
Figure 6C:
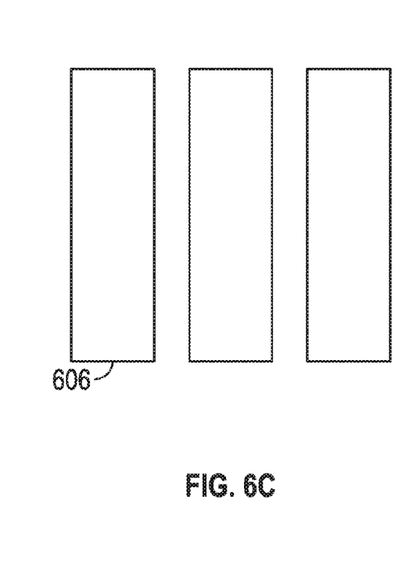
Figure 7A:
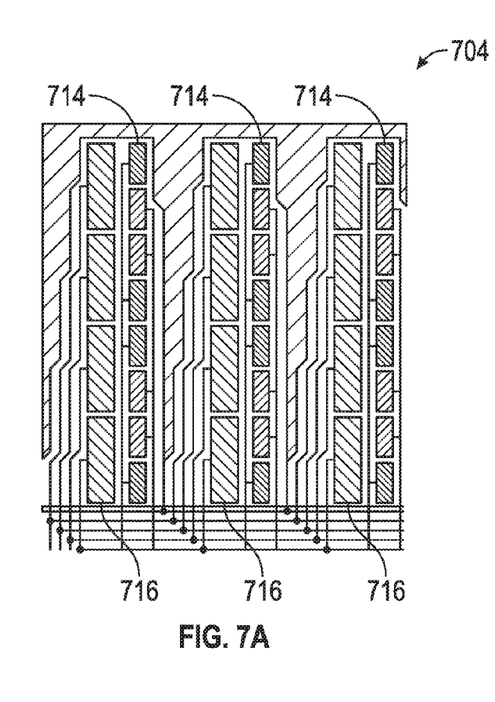
FIGS. 7A-7C illustrates a further alternate embodiment in which a top electrode layer is deposited in a single layer.
Figure 7B:
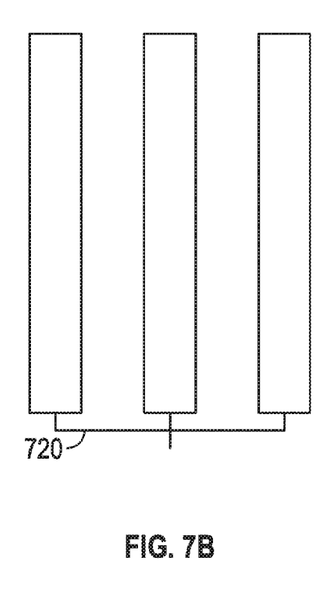
Figure 7C:
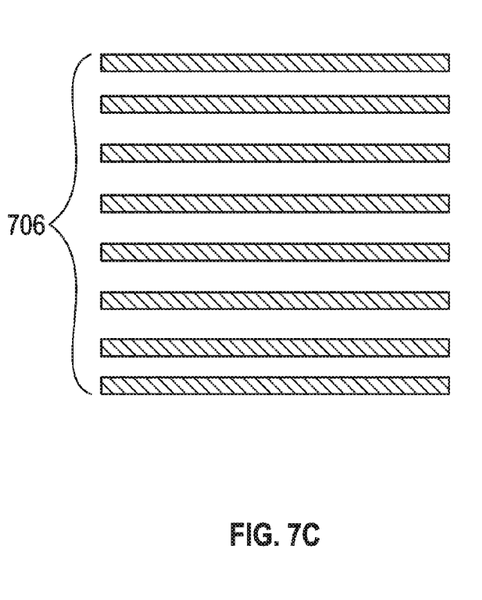

FIG. 4C is a top plan view of a bottom electrode layer 406 (generally analogous to the bottom electrode layer 306 of FIG. 3). The force receiver electrodes 406 exhibit a geometry which generally resembles the transmitter electrode layer 416 of FIG. 4A. Further examples of force receiver electrode geometry are shown in FIGS. 6-7.

Although FIGS. 4A-4C depict diamond shaped electrodes, it will be understood that any desired electrode configuration may be employed, provided that the shield electrode layer is configured to: i) provide electrical shielding between the touch receiver electrode layer 414 and the force receiver electrode layer 406 during deflection of the stackup 300 due to applied pressure from an input object; and ii) allow field lines to pass through the interstices within the shield layer 420 and interact with the force receiver layer 406 during deflection.

Figure 5:
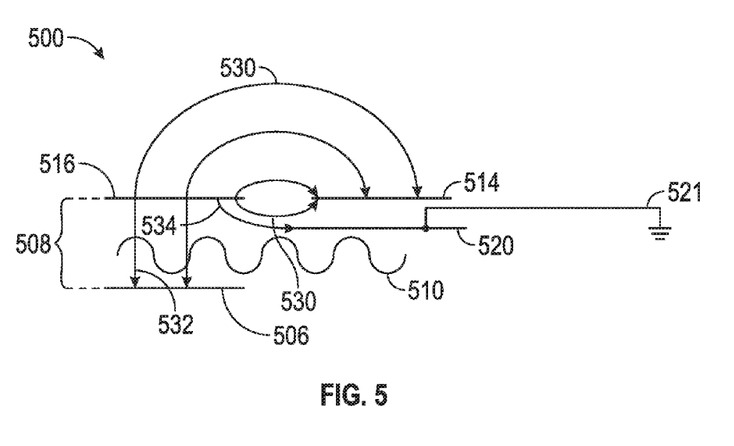
FIG. 5 is a schematic cross section view illustrating the electromagnetic field lines associated with a transmitter electrode, a touch receiver electrode, a shield electrode, and a force receiver electrode in accordance with an embodiment of the invention.

FIG. 5 is a close up view of a portion 500 of the stackup of FIG. 3. More particularly, the portion 500 includes a transmitter electrode 516, a touch receiver electrode 514, a force receiver electrode 506, a shield electrode 520, and a compressible dielectric layer 510. In the illustrated embodiment, electromagnetic field lines 530 extend from the transmitter electrode 516 to the touch receiver electrode 514, both above and below the common plane of the transmitter electrode 516 and touch receiver electrode 514. Below the plane, field lines 534 which would otherwise interact with the force receiver electrodes are captured by the shield electrode 520. Consequently, the capacitive coupling between the transmitter electrodes 516 and the receiver electrodes 514 remains independent of and uncorrupted by the deflection of the electrode layers due to applied pressure. Moreover, field lines 532 are allowed to freely pass from the transmitter electrode 516 and couple to the force receiver electrode 532 during deflection.

With continued reference to FIG. 5, note that the geometry (e.g., the size, shape, and spacing) of the transmitter electrode 516 generally corresponds to the geometry of the force receiver electrode 506 as well as to the spacing between respective touch receiver electrodes 514. In this way the capacitive coupling between the transmitter electrode 516 and the force receiver electrode 506 is substantially unaffected by the shield electrode 520 during deflection. In addition, the geometry (e.g., the size, shape, and spacing) of the touch receiver electrodes 514 generally corresponds to and is aligned with the shield electrode 520. Consequently, the touch receiver electrodes remain electrically isolated from the force receiver electrodes during deflection, with the result that the capacitive coupling between the transmitter electrode and the touch receiver electrode is substantially unaffected by the presence of the underlying force receiver electrodes during deflection.

In addition, because the shield electrode layer comprises a single voltage node, it may be maintained at a constant electrical potential (e.g., ground) using only a single wire 521, reducing cost and complexity of implementation.

FIGS. 6A-6C illustrate another embodiment of the present invention, wherein the top electrode layer (not shown) is generally similar to the top electrode layers 304 and 404 of FIGS. 3 and 4A, respectively, in that it comprises a substantially space filling array of sensor electrodes.

FIG. 6A is a top plan view of a top electrode layer 604 (generally analogous to the top electrode layer 304 of FIG. 3), showing first subset 614 of touch receiver electrodes and a second subset 616 of transmitter electrodes in accordance with an embodiment.

FIG. 6B is a top plan view of a shield electrode layer 620 (generally analogous to the shield electrode layer 420 of FIG. 3). Note that the geometry and layout of the shield electrode layer 620 generally corresponds to and is substantially aligned with the touch receiver electrode layer 614, except that, in an embodiment, the shield electrodes are slightly larger than the corresponding touch receiver electrodes.

FIG. 6C is a top plan view of a bottom electrode layer 606 (generally analogous to the bottom electrode layer 306 of FIG. 3). The force receiver electrodes 606 exhibit a geometry which generally resembles the transmitter electrode layer 616 of FIG. 6A.

FIGS. 7A-7C illustrates a further alternate embodiment in which a top electrode layer 704 is deposited in a single layer. Specifically, while electrode arrays 404 and 604 comprise "jumper" elements which ohmically isolated individual electrodes from the first subset and the second subset, the sensor electrodes in FIG. 7A require no jumper electrodes to determine positional information for input objects in a sensing region of the device. The top electrode layer 704 is just one example of a single layer sensor configuration without jumpers. Other embodiments may be found in co-pending U.S. patent application Ser. No. 13/740,122 (US 2013/0181943 A1) titled "Single Layer Capacitive Imaging Sensors" assigned to Synaptics Incorporated, the entire contents of which are incorporated herein by this reference.

FIG. 7A is a top plan view of a top electrode layer 704 (generally analogous to the top electrode layer 304 of FIG. 3), showing a first subset 714 of touch receiver electrodes and a second subset 716 of transmitter electrodes in accordance with an embodiment.

FIG. 7B is a top plan view of a shield electrode layer 720 (generally analogous to the shield electrode layer 420 of FIG. 4). Note that the geometry and layout of the shield electrode layer 720 generally corresponds to and is substantially aligned with the touch receiver electrode layer 714, except that, in an embodiment, the shield electrodes may be slightly larger than the corresponding touch receiver electrodes.

FIG. 7C is a top plan view of a bottom electrode layer 706 (generally analogous to the bottom electrode layer 306 of FIG. 3). The force receiver electrodes 706 exhibit a geometry different from the transmitter electrode layer 716 of FIG. 7A. The bottom electrode layer 706 comprises a plurality of sensor electrodes arranged substantially orthogonal to the sensor electrodes 716, but is nonetheless configured for capacitive coupling with the transmitter electrodes 716.

With continued reference to FIGS. 6-7 and referring again to FIG. 5, note that the geometry (e.g., the size, shape, and spacing) of the transmitter electrodes 616 and 716, as well as the spacing between respective touch receiver electrodes 614 and 714, results in the capacitive coupling between the transmitter electrodes and the force receiver electrodes being substantially unaffected by the shield electrode layers 620 and 720 during deflection. Consequently, the touch receiver electrodes remain electrically isolated from the force receiver electrodes during deflection, with the result that the capacitive coupling between the transmitter electrode and the touch receiver electrode is substantially unaffected by the presence of the underlying force receiver electrodes during deflection.

An input device for an electronic system is thus provided which includes: a pliable component having an input surface and a first plurality of sensor electrodes; a support substrate spaced apart from the pliable component; a second plurality of sensor electrodes disposed on a second substrate; a spacing layer disposed between the pliable component and the support substrate, the spacing layer configured to locally deform in response to a force applied to the input surface; and a shield electrode layer disposed between the first plurality and the second plurality of sensor electrodes.

In an embodiment, the shield electrode layer is configured to selectively electrically isolate the first plurality of sensor electrodes from the second plurality of sensor electrodes.

In an embodiment: the first plurality of sensor electrodes comprises a first subset characterized by a first geometric pattern and a second subset characterized by a second geometric pattern; and the shield electrode layer comprises an array of conductive segments overlaying the first geometric pattern and an array of voids overlaying the second geometric pattern.

In an embodiment, the second plurality of sensor electrodes is characterized by a third geometric pattern which substantially overlaps the array of voids, the array of conductive segments comprises a common voltage node.

In an embodiment, the shield electrode layer is ohmically coupled to a source of constant voltage potential.

In an embodiment, in response to a force applied to the input surface, a distance between at least one electrode from second subset of the first plurality of sensor electrodes and an electrode from the second plurality of sensor electrodes is reduced.

In an embodiment, the first plurality of sensor electrodes comprises a first subset and a second subset arranged in a single layer including jumpers configured to ohmically isolate the first subset from the second subset.

In an embodiment, the first plurality of sensor electrodes comprises a first subset and a second subset arranged in a single layer without the use of jumpers.

In an embodiment, the input device further comprises a flexible printed circuit board (PCB) electrically connected to the first and second pluralities of sensor electrodes, and not electrically connected to the shield electrode layer.

In an embodiment, the first plurality of sensor electrodes is configured to detect positional information for input objects in a sensing region of the input device.

In an embodiment, the first plurality of sensor electrodes comprises a first subset and a second subset disposed on one of: opposite sides of a first substrate; and the same side of the first substrate.

In an embodiment, the second plurality of sensor electrodes and a second subset of the first plurality of sensor electrodes are configured to detect force imparted to the input surface.

In an embodiment, the shield electrode layer is configured to shield the first resulting signal from the second resulting signal, wherein the first resulting signal remains substantially constant in response to force applied to the input surface, and the second resulting signal remains substantially constant in response to input object presence in the sensing region.

A processing system is also provided for use with an input device of the type including a pliable component having an input surface and a first plurality of sensor electrodes, a support substrate spaced apart from the pliable component, a second plurality of sensor electrodes disposed on a second substrate, a spacing layer disposed between the pliable component and the support substrate, the spacing layer configured to locally deform in response to a force applied to the input surface; and a shield electrode layer disposed between the first plurality and the second plurality of sensor electrodes. The processing system is communicatively coupled to the first and second pluralities of sensor electrodes and configured to: determine a first type of resulting signal from a first subset of the first plurality of sensor electrodes, and a second type of resulting signal from the second plurality of sensor electrodes, wherein the first type of resulting signal comprises effects of input objects proximate the input surface, and further wherein the second type of resulting signal comprises effects of a force applied to the input surface.

In an embodiment, the processing system is further configured to: determine a proximity image and a force image from the first and second types of resulting signals; and determine a user interface action based on at least one of the proximity image and the force image.

In an embodiment, the processing system is further configured to maintain the shield electrode layer at a constant voltage potential.

In an embodiment, the processing system is further configured to: drive a sensing signal onto a second subset of the first plurality of sensor electrodes; receive a first type of resulting signal from a first subset of the first plurality of sensor electrodes; and receive a second type of resulting signal from the second plurality of sensor electrodes; wherein the processing system is configured to determine positional and force information for an input object based on the first and second type of resulting signals.

In an embodiment, the first type of resulting signal includes effects of an input object in the sensing region, and the second type of resulting signal includes effects of force applied to the input surface.

An input device is also provided which includes: a pliable component having an input surface and a first plurality of sensor electrodes; a second plurality of sensor electrodes disposed on a second substrate; a spacing layer including a shield electrode layer disposed between first and second pluralities of sensor electrodes, the spacing layer configured to locally deform in response to a force applied to the input surface; and a processing system communicatively coupled to the first and second pluralities of sensor electrodes and configured to determine a first type of resulting signal from a first subset of the first plurality of sensor electrodes, and a second type of resulting signal from the second plurality of sensor electrodes, wherein the first type of resulting signal comprises effects of input objects proximate the input surface, and the second type of resulting signal comprises effects of a force applied to the input surface.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Other embodiments, uses, and advantages of the invention will be apparent to those skilled in art from the specification and the practice of the disclosed invention.

What is claimed is:

1. An input device for an electronic system, comprising:
a pliable component having an input surface and a first plurality of sensor electrodes, the first plurality of sensor electrodes comprising a first subset characterized by a first geometric pattern and a second subset characterized by a second geometric pattern;
a support substrate spaced apart from the pliable component;
a second plurality of sensor electrodes disposed on a second substrate;
a spacing layer disposed between the pliable component and the support substrate, the spacing layer configured to locally deform in response to a force applied to the input surface; and
a shield electrode layer:
disposed between the first plurality of sensor electrodes and the second plurality of sensor electrodes;

comprising an array of conductive segments overlaying the first geometric pattern and an array of voids overlaying the second geometric pattern; and configured to electrically shield the first plurality of sensor electrodes from the second plurality of sensor electrodes so that a touch image measured is substantially independent of the force applied to the input surface.

2. The input device of claim 1, wherein the second plurality of sensor electrodes is characterized by a third geometric pattern which substantially overlaps the array of voids.

3. The input device of claim 1, wherein the array of conductive segments comprises a common voltage node.

4. The input device of claim 3, wherein the shield electrode layer is ohmically coupled to a source of constant electrical potential.

5. The input device of claim 1, wherein, in response to a force applied to the input surface, a distance between at least one electrode of the second subset of the first plurality of sensor electrodes and an electrode from the second plurality of sensor electrodes is reduced.

6. The input device of claim 1, wherein the first subset and the second subset are arranged in a single layer including jumpers configured to ohmically isolate the first subset from the second subset.

7. The input device of claim 1, wherein the first subset and the second subset arranged in a single layer without the use of jumpers.

8. The input device of claim 1, further comprising a flexible printed circuit board (PCB) electrically connected to the first plurality of sensor electrodes and the second plurality of sensor electrodes, and not electrically connected to the shield electrode layer.

9. The input device of claim 1, wherein the first plurality of sensor electrodes is configured to detect positional information for input objects in a sensing region of the input device.

10. The input device of claim 1, wherein the first subset and the second subset disposed on one of: opposite sides of a first substrate; and the same side of the first substrate.

11. The input device of claim 10, wherein the second plurality of sensor electrodes and the second subset of the first plurality of sensor electrodes are configured to detect force imparted to the input surface.

12. A processing system for use with an input device of the type including
a pliable component having an input surface and a first plurality of sensor electrodes, the first plurality of sensor electrodes comprising a first subset characterized by a first geometric pattern and a second subset characterized by a second geometric pattern;
a support substrate spaced apart from the pliable component;
a second plurality of sensor electrodes disposed on a second substrate;
a spacing layer disposed between the pliable component and the support substrate, the spacing layer configured to locally deform in response to a force applied to the input surface; and
a shield electrode layer:
disposed between the first plurality of sensor electrodes and the second plurality of sensor electrodes;
comprising an array of conductive segments overlaying the first geometric pattern and an array of voids overlaying the second geometric pattern; and
configured to electrically shield the first plurality of sensor electrodes from the second plurality of sensor electrodes so that a touch image measured is substantially independent of the force applied to the input surface;

the processing system configured to be communicatively coupled to the first plurality of sensor electrodes and to the second plurality of sensor electrodes and configured to:
determine a first type of resulting signal from a first subset of the first plurality of sensor electrodes, and a second type of resulting signal from the second plurality of sensor electrodes,
wherein the first type of resulting signal comprises effects of input objects proximate the input surface, and further wherein the second type of resulting signal comprises effects of a force applied to the input surface.

13. The processing system of claim 12, further configured to:
determine a proximity image and a force image from the first and second types of resulting signals; and
determine a user interface action based on at least one of the proximity image and the force image.

14. The processing system of claim 12, further configured to maintain the shield electrode layer at a constant electrical potential.

15. The processing system of claim 12, further configured to:
drive a sensing signal onto the second subset of the first plurality of sensor electrodes;
receive a first type of resulting signal from the first subset of the first plurality of sensor electrodes; and
receive a second type of resulting signal from the second plurality of sensor electrodes; wherein the processing system is configured to determine positional and force information for an input object based on the first and second type of resulting signals.

16. The processing system of claim 15, wherein the first type of resulting signal includes effects of an input object in the sensing region, and the second type of resulting signal includes effects of force applied to the input surface.

17. The processing system of claim 15, wherein the first resulting signal remains substantially constant in response to force applied to the input surface, and the second resulting signal remains substantially constant in response to input object presence in the sensing region.

18. An input device, comprising:
a pliable component having an input surface and a first plurality of sensor electrodes;
a second plurality of sensor electrodes disposed on a second substrate, the first plurality of sensor electrodes comprising a first subset characterized by a first geometric pattern and a second subset characterized by a second geometric pattern;
a spacing layer including a shield electrode layer disposed between first and second pluralities of sensor electrodes, the spacing layer configured to locally deform in response to a force applied to the input surface,
wherein the shield electrode layer is configured to electrically shield the first plurality of sensor electrodes from the second plurality of sensor electrodes so that a touch image measured is substantially independent of the force applied to the input surface, and wherein the shield layer comprises an array of conductive segments overlaying the first geometric pattern and an array of voids overlaying the second geometric pattern; and a processing system communicatively coupled to the first plurality of sensor electrodes and to the second plurality of sensor electrodes and configured to determine a first type of resulting signal from a first subset of the first plurality of sensor electrodes, and a second type of resulting signal from the second plurality of sensor electrodes, wherein the first type of resulting signal comprises effects of input objects proximate the input surface, and the second type of resulting signal comprises effects of a force applied to the input surface.

* * * * *

UNITED STATES PATENT AND TRADEMARK OFFICE
CERTIFICATE OF CORRECTION

PATENT NO. : 9,632,638 B2  Page 1 of 1
APPLICATION NO. : 14/482121
DATED : April 25, 2017
INVENTOR(S) : Patrick Worfolk It is certified that error appears in the above-identified patent and that said Letters Patent is hereby corrected as shown below:

On the Title Page

On page 2, item (56) References Cited, under *U.S. PATENT DOCUMENTS*, second column, Line 2, "G te" should read -- Gute --.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*